US012260473B2

United States Patent
Myers et al.

(10) Patent No.: US 12,260,473 B2
(45) Date of Patent: Mar. 25, 2025

(54) SYSTEM AND METHOD FOR ACCELERATED CONVERGENCE OF ITERATIVE TOMOGRAPHIC RECONSTRUCTION

(71) Applicant: FEI Company, Hillsboro, OR (US)

(72) Inventors: Glenn Myers, Coombs (AU); Andrew Kingston, Kambah (AU); Adrian Sheppard, Fisher (AU); Shane Latham, Griffith (AU); Trond Varslot, Vuku (NO)

(73) Assignee: FEI Company, Hillsboro, OR (US)

( * ) Notice: Subject to any disclaimer, the term of this patent is extended or adjusted under 35 U.S.C. 154(b) by 346 days.

(21) Appl. No.: 17/958,110

(22) Filed: Sep. 30, 2022

(65) Prior Publication Data

US 2023/0103037 A1    Mar. 30, 2023

Related U.S. Application Data

(60) Provisional application No. 63/250,785, filed on Sep. 30, 2021.

(51) Int. Cl.
G06V 10/00    (2022.01)
G06T 11/00    (2006.01)

(52) U.S. Cl.
CPC ....... *G06T 11/005* (2013.01); *G06T 2211/424* (2013.01)

(58) Field of Classification Search
CPC ................ G06T 11/005; G06T 11/006; G06T 2211/424; A61B 6/03; A61B 6/032;
(Continued)

(56) References Cited

U.S. PATENT DOCUMENTS 4,150,292 A *  4/1979  Ter-Pogossian ...... G01T 1/2985
                                                            250/363.03
4,284,895 A *  8/1981  Morgan ............... G01N 23/046
                                                            250/363.02
(Continued)

OTHER PUBLICATIONS

Clinthorne et al. "Preconditioning Methods for Improved Convergence Rates in Iterative Reconstructions" IEEE Transactions on Medical Imaging, Mar. 1993, vol. 12, No. 1, pp. 78-83.
(Continued)

*Primary Examiner* — Amir Alavi
(74) *Attorney, Agent, or Firm* — Kilpatrick Townsend & Stockton LLP

(57) ABSTRACT

Methods and systems for generation and use of an accelerated tomographic reconstruction preconditioner (ATRP) for accelerated iterative tomographic reconstruction are disclosed. An example method for generating an ATRP for accelerated iterative tomographic reconstruction includes accessing data for a tomography investigation of a sample and determining a trajectory of the tomography investigation of a sample. At least one toy model sample depicting a feature characteristic of the sample are accessed and at least one candidate preconditioner is selected. A first performance of each of the at least one candidate preconditioner on the one or more toy samples is determined, where the candidate preconditioners are then updated to create updated candidate preconditioners. A second performance of each of the updated candidate preconditioners on the one or more toy samples is determined determining. An ATRP is then generated based on at least the first performance and the second performance.

22 Claims, 4 Drawing Sheets

(58) Field of Classification Search
CPC ....... A61B 5/033; A61B 5/0036; A61B 5/055; A61B 5/70
See application file for complete search history.

(56) References Cited

U.S. PATENT DOCUMENTS

| | | | | |
|---|---|---|---|---|
| 7,581,191 | B2* | 8/2009 | Rice | A61B 5/0059 382/280 |
| 8,090,179 | B2* | 1/2012 | Vija | G06T 11/006 382/265 |
| 8,194,821 | B2* | 6/2012 | Seppi | G21K 1/10 378/62 |
| 8,246,531 | B2* | 8/2012 | Vaquero Lopez | A61B 5/0059 600/430 |
| 9,619,902 | B2 | 4/2017 | Batenburg et al. | |
| 9,996,951 | B2* | 6/2018 | Sijbers | G06T 11/006 |
| 10,064,584 | B2* | 9/2018 | Yared | A61B 5/0064 |
| 11,160,520 | B2* | 11/2021 | Vija | A61B 6/548 |
| 11,307,086 | B2* | 4/2022 | Killich | G01J 1/4228 |
| 11,644,584 | B2* | 5/2023 | Ma | G01T 1/242 250/370.08 |
| 2014/0369581 | A1 | 12/2014 | Fu et al. | |
| 2022/0151578 | A1* | 5/2022 | Hummel | A61B 6/027 |

OTHER PUBLICATIONS

Pelt et al. "Fast tomographic reconstruction from limited data using artificial neural networks" IEEE Transactions on Image Processing, 2013, vol. 22, No. 12, pp. 5238-5251.

Pelt et al., "Improving filtered backprojection reconstruction by data-dependent filtering," IEEE Transactions on Image Processing, 2014, vol. 23, No. 11, pp. 4750-4762.

Würfl et al., "Deep Learning Computed Tomography: Learning Projection-Domain Weights From Image Domain in Limited Angle Problems," IEEE Transactions on Image Processing, Jun. 2018, vol. 37, No. 6, pp. 1454-1463.

* cited by examiner

SYSTEM AND METHOD FOR ACCELERATED CONVERGENCE OF ITERATIVE TOMOGRAPHIC RECONSTRUCTION

This application claims priority from U.S. Provisional Application No. 63/250,785 filed Sep. 30, 2021, which is hereby incorporated by reference.

BACKGROUND OF THE INVENTION

Electron tomography and X-ray tomography are techniques for obtaining detailed reconstructions of specimens investigated with a transmission electron microscope (TEM) or a scanning transmission electron microscope (STEM) during which a beam of electrons is passed through a specimen at a plurality of incident angles. The plurality of these angles forms a "scanning trajectory". Tomographic reconstruction algorithms (TRAs) are then applied to the collection of detector data (e.g., radiographs) collected at each of the incident angles to generate reconstructions of the sample. TRAs fall into two categories: (a) non-iterative reconstruction algorithms (i.e., direct methods), in which the algorithms generate reconstructions from the detector data in a single step; and (b) iterative reconstructive algorithms which begin with an estimate of the solution, and produce a more accurate estimate using the plurality of detector data. In the case of an iterative TRA, this algorithm is then iterated until a final solution is reached. The number or sequence of iterations in a TRA may change depending on the results of a previous iteration: for example, the algorithm may stop when a "stopping condition" is reached.

Currently, direct TRAs are the industry standard for most X-ray micro-CT applications due to the speed at which the singular step algorithm can generate a reconstruction. While direct TRAs have a reduced time to result, there are many drawbacks to direct TRAs as compared to iterative methods. For example, because direct TRAs rely on a single step; this single step must be specifically tailored, developed, or otherwise trained for a specific scanning trajectory (if the algorithm is analytically derived from first principles) or application/sample type (if the algorithm is trained, tailored, etc.). Analytically/mathematically-derived direct TRAs only exist for specific scanning trajectories; any deviation (e.g. due to vibration, thermal drift, or application constraints) will degrade the reconstruction. Trained TRAs are more generally applicable to different scanning trajectories, but must be specifically tailored, developed, or otherwise trained for a specific application or sample. That is, in order for the single step of a trained, direct TRA to result in an accurate reconstruction, that single step must be specifically configured to interpret and/or process detector data would be produced by a specific application and/or sample type. The further the application and/or sample type is from the application/sample type to which the direct TRA was trained, the less accurate the reconstruction generated by the direct TRA will be. This means that for accurate reconstructions, each application/sample type requires a single step requires a uniquely tailored direct TRA.

However, iterative TRAs do not have this limitation. Rather, because iterative TRAs include a plurality of steps, iterative TRAs are better able to interpret and/or reconstruct detector data from a wide array of scanning trajectories, applications and sample types. Because of this flexibility, tomographic reconstructions generated for workflows that include multiple applications/sample types would be greatly improved by the use of iterative TRAs. Accordingly, it is desired to have systems and methods for generating faster iterative TRAs, as well as systems and methods for employing such faster iterative TRAs to provide shorter times to results for electron/X-ray tomography.

SUMMARY

Methods and systems for the generation and use of an accelerated tomographic reconstruction preconditioner for accelerated iterative tomographic reconstruction are disclosed. An example method for generating an accelerated tomographic reconstruction preconditioner for accelerated iterative tomographic reconstruction includes accessing data for a tomography investigation of a sample, and then determining the trajectory of a source of penetrating radiation relative to the sample (e.g., the pattern of source positions relative to the sample), in that investigation. Additionally, at least one "toy model sample" which corresponds to a simulated model depicting a feature is constructed. Additionally, at least one "starting" candidate preconditioner is selected. A first performance of each of the (at least one) candidate preconditioner(s) on the (one or more) toy samples is determined, where the candidate preconditioners are then updated to create updated candidate preconditioners. A second performance of each of the updated candidate preconditioners on the one or more toy samples is determined. An accelerated tomographic reconstruction preconditioner is then generated based on at least the first performance and the second performance.

The accelerated tomographic reconstruction preconditioner is configured to expedite the convergence of an iterative tomographic reconstruction algorithm by reducing the number of iterations required for an iterative tomographic reconstruction algorithm to subsequently come to a tomographic reconstruction of the sample. According to the present invention, the accelerated tomographic reconstruction preconditioners generated using the methods and systems herein may be configured to apply across different trajectories of the source of penetrating radiation relative to the sample, in the tomography investigation of the sample. Further, the accelerated tomographic reconstruction preconditioners generated using the methods and systems herein may also be agnostic to the sample, types of sample, and/or sample features.

An example method for using an accelerated tomographic reconstruction preconditioner for accelerated iterative tomographic reconstruction includes receiving experimental detector data from an experimental tomographic investigation of a sample. A preconditioned iterative tomographic reconstruction algorithm is then applied to the preconditioned experimental detector data to generate a tomographic reconstruction of the sample based on the preconditioned experimental detector data. As part of this preconditioned iterative tomographic reconstruction algorithm, a tomographic reconstruction preconditioner will be applied to either (or both) of: (i) processed experimental detector data; or (ii) the update that the iterative reconstruction algorithm applies to the estimated tomographic reconstruction, at each iteration. For example, in some embodiments the experimental detector data may be linearized or otherwise preprocessed before the preconditioner is applied. Whether applied to processed projections, or calculated updates to the reconstruction volume, the reconstruction preconditioner at least partially removes the effects of a point-spread function (PSF) of the experimental system on the experimental detector data such that the preconditioned data requires fewer iterations from the iterative tomographic reconstructive algorithm to obtain a final result, than it would take for the experimental detector data. The tomographic reconstruction preconditioner may be generated based at least in part on a comparison between simulated data from a simulation of a test experiment and acquired data from the actual test experiment. For example, the tomographic reconstruction preconditioner can be generated based on a simulated experiment with characteristics that are designed to mimic the characteristics of the actual test experiment.

Systems for generation and use of an accelerated tomographic reconstruction preconditioner for accelerated iterative tomographic reconstruction are disclosed, comprising a charged particle emitter or X-ray emitter configured to emit a charged particle beam or X-ray radiation towards a sample, a sample holder configured to hold the sample, and a detector system configured to detect emissions resultant from the irradiation of the sample with the charged particle beam during tomographic investigation of the sample. The systems further include one or more processors, and a memory storing non-transitory computer readable instructions, that when executed by the one or more processors, cause the charged particle system to generate and/or use an accelerated tomographic reconstruction preconditioner for accelerated iterative tomographic reconstruction.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicates similar or identical items.

Figure 1:
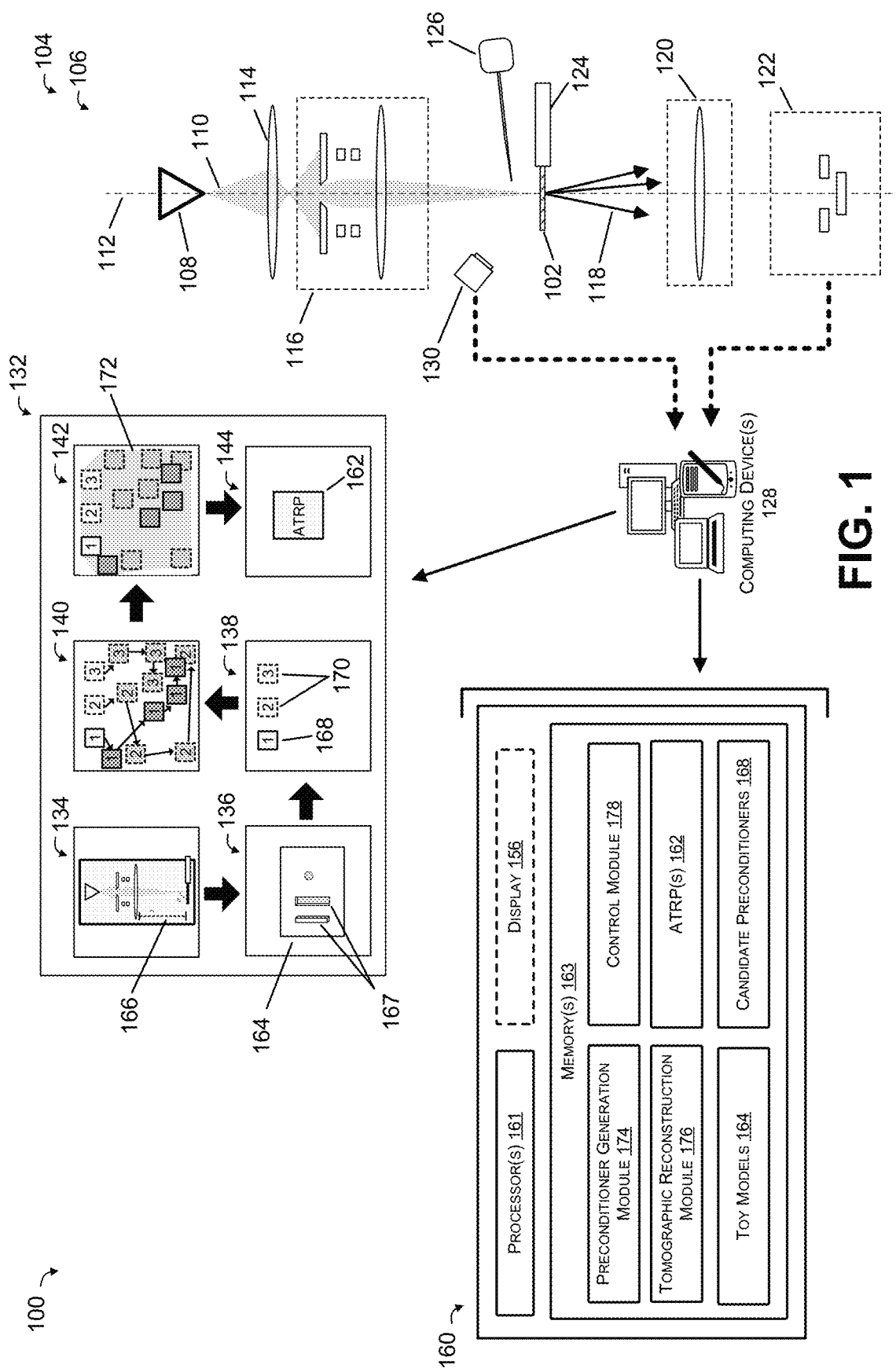
FIG. 1 illustrates an example charged particle environment for accelerated convergence of tomographic reconstructions using iterative TRAs.

Like reference numerals refer to corresponding parts throughout the several views of the drawings. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

DETAILED DESCRIPTION OF EMBODIMENTS

Methods and systems for accelerated convergence of tomographic reconstructions using iterative tomographic reconstruction algorithms (TRAs) are disclosed, as well as systems for developing fast-converging iterative TRAs are disclosed herein. More specifically, the disclosure includes improved methods and systems that utilize specially-configured methods and systems that generate and/or utilize accelerated tomographic reconstruction preconditioners, that are configured to cause TRAs to more rapidly generate detailed reconstructions of specimens investigated using tomographic techniques. The accelerated tomographic reconstruction preconditioners generated and used according to the present disclosure cause iterative TRAs to quickly converge to a reconstruction, by removing at least a portion of the point-spread function (PSF) of the experimental setup without causing the algorithm to overstep the solution, thus drastically reducing the number of iterations that an iterative TRA needs to perform to generate a good-quality reconstruction of the sample. A person having skill in the art would understand that a "good quality" tomographic reconstruction is application dependent, and varies with both the workflow in which the tomographic imaging is used (e.g., automated interpretation, human image interpretation, AI interpretation, etc.) and the question this workflow is intended to answer (e.g., product defect inspection, pore-network analysis in porous materials, etc.). Accordingly, a "good quality" tomographic reconstruction within the present disclosure is a reconstruction that provides sufficient predictive power as part of its associated workflow, to answer a question of interest, while being subject to any time or dose constraints imposed by the application.

In this way, the accelerated tomographic reconstruction preconditioners described in the present disclosure allow iterative TRAs to more quickly generate specimen reconstructions while also reducing the computational workload necessary to generate specimen reconstructions using tomographic techniques. By using the methods and systems of the present disclosure, a preconditioner can be generated for the specific trajectory of the charged particle environment during the corresponding tomographic investigation of the sample.

FIG. 1 is an illustration of example environment 100 for accelerated convergence of tomographic reconstructions using iterative TRAs. Specifically, FIG. 1 shows example environment 100 as including example charged particle system(s) 104 for investigation and/or analysis of a sample 102. The example charged particle system(s) 104 may be or include one or more different types of optical, and/or charged particle microscopes, such as, but not limited to, a scanning transmission electron microscope (STEM), a transmission electron microscope (TEM), a charged particle microscope (CPM), a cryo-compatible microscope, focused ion beam microscope (FIBs), dual beam microscopy system, or combinations thereof. FIG. 1 shows the example charged particle microscope system(s) 104 as being a transmission electron microscope (TEM) 106. It is noted that the system depicted in FIG. 1 is a charged particle system, but a person of ordinary skill in the art would understand how the system could be an X-ray tomography system (e.g., a X-ray MicroCT system).

The example charged particle microscope system(s) 104 includes a charged particle source 108 (e.g., a thermal electron source, Schottky-emission source, field emission source, etc.) that emits an electron beam 110 along an emission axis 112 and towards an accelerator lens 114. However, a person having skill in the art would understand that an X-ray tomography system according to the present disclosure would have an X-ray source 108 configured to emit X-ray radiation towards the sample 102. The emission axis 112 is a central axis that runs along the length of the example charged particle microscope system(s) 104 from the charged particle source 108 and through the sample 102. The accelerator lens 114 that accelerates/decelerates, focuses, and/or directs the electron beam 110 towards a focusing column 116. The focusing column 116 focuses the electron beam 110 so that it is incident on at least a portion of the sample 102. In some embodiments, the focusing column 116 may include one or more of an apertures, scan coils, and upper condenser lens. The focusing column focuses electrons from electron source into a small spot on the sample. Different locations of the sample 102 may be scanned by adjusting the electron beam direction via the scan coils. Additionally, the focusing column 116 may correct and/or tune aberrations (e.g., geometric aberrations, chromatic aberrations) of the electron beam 110.

During electron tomography, the electron beam 110 is directed such that it irradiates and/or passed through the sample 102 at incremental degrees of rotation around the center of the sample 102. Electrons 118 passing through sample 102 at each degree of rotation may enter projector 120. In one embodiment, the projector 120 may be a separate part from the focusing column 116. In another embodiment, the projector 120 may be an extension of the lens field from a lens in focusing column 116. The projector 120 may be adjusted so that direct electrons 118 passed through the sample 102, impinge on a microscope detector system 122. In this way, for each incremental degree of rotation that the sample 102 is irradiated by the electron beam 110, the detector system 122 receives information about the sample 102 and generates tomographic data. This sample information can be used with the associated incremental degrees of rotation to generate a recreation of the sample 102. Specifically, a tomographic reconstruction algorithm (TRA) is applied to the tomographic data to generate such a reconstruction (e.g., an image of the sample, a model of the sample, etc.) of sample 102 or a portion thereof. While the example system described 104 in claim 1 is configured to perform electron tomography, it is noted that a person having skill in the art would understand that the systems and methods of the present disclosure would be applied within the field of X-ray tomography.

In FIG. 1, the microscope detector system 122 is illustrated as including a disk-shaped bright field detector and dark field detector(s). In some embodiments, the microscope detector system 122 may include one or more other detectors. Alternatively, or in addition, the microscope detector system 122 may include a scanning electron microscope detector system, a focused ion beam detector system, a scanning electron microscope secondary electron detector system, a focused ion beam secondary electron detector system, and an optical microscope detector system.

FIG. 1 further illustrates the example charged particle microscope system(s) 104 as further including a sample holder 124, a sample manipulation probe 126, computing devices 128, and one or more imaging sensor(s) 130. While shown in FIG. 1 as being mounted above the sample 102, a person having skill in the art would understand that imaging sensors 130 may be mounted at other locations within the example charged particle microscope system(s) 104, such as but not limited to, below the sample 102 (e.g., proximate to the microscope detector system 122). The sample holder 124 is configured to hold the sample 102, and is able to translate, rotate, and/or tilt the sample 102 in relation to the example charged particle microscope system(s) 104. Similarly, the sample manipulation probe 120 is configured to hold, transport, and/or otherwise manipulate the sample 102 within the example charged particle microscope system(s) 104. For example, in a dual beam charged particle microscope system, the sample manipulation probe 120 may be used to transport a lamella created from a larger object to a position on the sample holder 118 where the lamella can be investigated and/or analyzed by the charged particle microscope system.

The computing device(s) 128 are configured to generate and/or utilize accelerated tomographic reconstruction preconditioners configured to cause iterative TRAs to more rapidly generate detailed reconstructions of the sample 102 from tomographic data obtained from the microscope detector system 122. That is, according to the present disclosure the computing device(s) 128 may be configured to generate an accelerated tomographic reconstruction preconditioner (ATRP) 162 that is configured to expedite the convergence of an iterative TRA. The ATRPs 162 of the present disclosure achieves this by reducing at least a portion of the effects of the point spread function (PSF) of the charged particle system 104 in detector data detected by detector system 122 during a tomographic investigation of sample 102. The PSF corresponds to the blurring of the sample reconstructions generated based on the emissions/detector data, caused in part by the trajectory of the source relative to the sample in the charged particle microscope system 104 during data acquisition. This trajectory corresponds to the relative geometric relationships of the source of penetrating radiation, the charged particle beam, and/or the sample during the tomographic investigation. For example, when reconstructing a 3D model of the 102 sample, individual instances of tomographic detector data acquired at corresponding beam angles may not capture and/or may capture a distorted version of one or more portions of the sample, causing a PSF blurring effect for these portions of the sample. This failure to capture portions of the sample and/or to capture a distorted version of portions of the sample may be due to such portions being hidden, occluded behind other structures, and/or otherwise interfered with when the particular instance of tomographic detector data was captured due to the position of the charged particle source 110, the position of the sample 102, the beam angle, or a combination thereof (i.e., the trajectory of the system). The ATRPs 162 of the present disclosure can be applied to the tomographic data from detector system 122 obtained during tomographic investigation of sample 102 to remove at least a portion of this induced blurring from the tomographic data.

In this way, the number of iterations necessary for iterative TRAs to generate tomographic reconstructions of the sample 102 from experimental tomographic data preconditioned with ATRP 162 is greatly reduced. This not only reduces the computational processing required to achieve tomographic results with iterative TRAs, but it also greatly reduces the time needed to obtain such results. Thus, the ATRPs 162 of the present disclosure cause tomographic processes utilizing iterative TRAs, which are currently too time and computationally costly to be widely practiced, to become a practicable alternative to prior art direct TRAs. Moreover, the ATRPs 162 of the present disclosure achieve these results without over correcting and/or overstepping the solution to the PSF. This is crucial as present iterative TRAs produce artefacts in the reconstruction when such overstepping has occurred.

In some embodiments, the ATRP 162 of the present disclosure are also configured to be applied to tomographic investigations of different samples, types of samples, and/or sample features. Prior art TRAs fall into 3 categories: (i) iterative, untrained and un-preconditioned TRAs which take a long time to converge on a solution; (ii) direct and preconditioned-iterative TRAs which can only be applied to specific scanning trajectories; and (iii) iterative and direct TRAs which are trained to a specific sample such that they can only generate tomographic reconstructions for tomographic data from investigations of samples identical or highly similar to the samples used to train the prior art TRA. Because of this, the effectiveness of current TRAs (both iterative and direct) are limited to applications where only nearly identical samples are investigated. While useful for some applications, prior art TRAs struggle to generate reconstructions when information about the sample 102 is not known prior to the investigation. ATRPs 162 of the present disclosure overcome this problem by being trained by toy models 164. These toy models 164 are simulated models that are generated to have feature characteristics that correspond to features that are desired to influence the ATRP 162. For example, an ATRP 162 may be generated using one or more toy models 164 that have features expected to be present in sample 102. Alternately, an ATRP may be generated using one-or-more toy models that have features which are "pathological" (i.e., difficult to reconstruct, or highly obscured by the PSF) for a given trajectory of the source of penetrating radiation relative to the sample. For example, the one or more features may be features that are to difficult or time intensive to reconstruct, such as features with rapid variations (e.g., large variations in the direction one or more axis). In this way, methods of the present disclosure generate ATRPs 162 that are applicable across a wide range of samples, sample types, expected features, or a combination thereof.

Alternatively, or in addition, the computing device(s) 128 may be configured to generate a tomographic reconstruction of the sample 102 using an ATRP 162 and an iterative TRA. By using an ATRP 162 preconditioner according to the present disclosure the iterative TRA is able to more rapidly generate tomographic reconstructions of the sample 102. Moreover, by preprocessing the tomographic data from microscope detector system 122 with an ATRP 162 according to the present disclosure, the computer processing requirements that the iterative TRA requires to generate the tomographic reconstruction is also greatly reduced. Thus, the processes using ATRP 162 described in the present disclosure enable iterative TRAs to overcome at least two of the key limitations that motivates prior art tomographic investigation processes to use direct TRAs over iterative TRAs (i.e., time to results constraints and computational/processing limitations of computing device(s) 128).

For example, the computing device(s) 128 may generate a tomographic reconstruction of the sample 102 by obtaining experimental tomographic data from an experimental tomographic investigation of sample 102, and then apply an ATRP 162 to the experimental tomographic data to generate preconditioned data. An iterative TRA is then applied by the computing devices 128 to the preconditioned data to obtain a tomographic reconstruction of sample 102. In various embodiments, the ATRP 162 is generated or otherwise selected by computing device 128 based at least in part on a comparison between simulated data from a simulation of a test experiment and acquired data from the actual test experiment. For example, the ATRP 162 may be trained using simulations of test experiments that are designed to mimic the characteristics of the actual test experiment.

Those skilled in the art will appreciate that the computing devices 128 depicted in FIG. 1 are merely illustrative and are not intended to limit the scope of the present disclosure. The computing system and devices may include any combination of hardware or software that can perform the indicated functions, including computers, network devices, internet appliances, PDAs, wireless phones, controllers, oscilloscopes, amplifiers, etc. The computing devices 128 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

It is also noted that the computing device(s) 128 may be a component of the example charged particle microscope system(s) 104, may be a separate device from the example charged particle microscope system(s) 104 which is in communication with the example charged particle microscope system(s) 104 via a network communication interface, or a combination thereof. For example, an example charged particle microscope system(s) 104 may include a first computing device 128 that is a component portion of the example charged particle microscope system(s) 104, and which acts as a controller that drives the operation of the example charged particle microscope system(s) 104 (e.g., adjust the scanning location on the sample 102 by operating the scan coils, etc.). In such an embodiment the example charged particle microscope system(s) 104 may also include a second computing device 128 that is desktop computer separate from the example charged particle microscope system(s) 104, and which is executable to process data received from the imaging sensor(s) 130 to generate images of the sample 102 and/or perform other types of analysis. The computing devices 128 may further be configured to receive user selections via a keyboard, mouse, touchpad, touchscreen, etc.

FIG. 1 also depicts a visual flow diagram 132 that includes a plurality of images that together depict an example process that may be performed by the computing device(s) 128 generate an ATRP 162 preconditioner according to the present disclosure. For example, image 134 shows an image of the trajectory information 166 (e.g., a path of the charged particles 110, an angle the charged particles strike the sample 102, a position of the sample, etc.) of charged particle system 104 being obtained. In various embodiments the trajectory information 166 may be obtained by accessing measured data from an experimental tomography investigation of the sample (e.g., sensor data, alignment information, system configurations, recorded images etc.), accessing user input trajectory information, accessing simulated data from a simulated tomography investigation of the sample, or a combination thereof. The trajectory information 166 may account for at least one of thermal drift errors, sample motion errors, or other experimental errors.

Image 136 depicts a toy model 164 selected or otherwise generated for training of the ATRP 162. A toy model 164 is a simulated model that is generated or otherwise selected to have feature characteristics 167 that correspond to features that are desired to influence the ATRP 162. One or more toy models may be used to train the ATRP 162. Individual toy models 164 may be generated by a user (e.g., hard coded), synthesized by a computer, selected from a previously generated collection of premade toy models, or a combination thereof, such that they include features that are expected to be present in the sample 102 or is otherwise deemed to be important to the tomographic investigation (e.g., a trait being imaged in the particular use case, a pathological feature, etc.). For example, a toy model 164 may be generated by a computer device 128 such that they include a plurality of user selected features. Alternatively, or in addition, a toy model 164 may be selected by a user or computer device 128 from a plurality of premade toy models based on the characteristics of the sample 102, charged particle system 104 configuration, desired characteristics of the tomographic reconstruction result, etc. In this way, methods of the present disclosure generate ATRPs 162 that are applicable across a wide range of samples, sample types, expected features, or a combination thereof.

Image 138 depicts a candidate preconditioner 168 that is used for the training of the ATRP 162. Image 138 further depicts optional additional candidate preconditioners 170 that may be used to train the ATRP 162. The candidate preconditioner(s) 168, 170 may be generated by computing devices 128 based on one or more factors, including by not limited to a type of experiment, type of sample, a sample characteristic, a user selection, etc. Alternatively, or in addition, candidate preconditioner(s) 168, 170 may selected from a group of premade candidate preconditioners. For example, a candidate preconditioner 168 may be selected by computing devices 128 based on a type of experiment, type of sample, a sample characteristic, a user selection, etc. In some embodiments, the computing devices 128 assume that each candidate preconditioner 168, 170 has an equal probability of being a solution to the PSF for the charged particle system 104 configuration for the tomographic investigation of sample 102.

Image 140 shows the computing device exploring the preconditioner probability space by repeatedly testing and updating the candidate preconditioners 168, 170. For example, the computing device 128 may determine the performance of each candidate preconditioner 168, 170 by testing the performance of each of the candidate preconditioners on the one or more toy samples 164. Each preconditioner may then be assigned a probability of being correct, based on its performance. Such a testing may include the computing devices 128 synthesizing tomographic investigations of the one or more toy samples 164, modeling tomographic data for the synthesized tomographic investigations, and then applying a candidate preconditioner 168 to the modeled tomographic data to obtain preconditioned synthesized tomographic data. The computing systems 128 may then apply an iterative TRA to the preconditioned modeled tomographic data to generate a tomographic reconstruction of one or more toy models, and then determine a performance score of the candidate preconditioner 128 based on the toy model 164 and the generated reconstruction.

Image 140 further illustrates each of the candidate preconditioners 168, 170 being updated by the computing devices 128 after this initial test. This process is then iteratively repeated so that the computing devices 128 explore the probability space of possible preconditioners. In various embodiments the computing devices 128 may update the candidate preconditioners 168, 170 to improve the performance of the corresponding candidate preconditioner, to explore an associated probability space of potential preconditioners. For example, the candidate preconditioners may be updated by a machine learning algorithm, gradient ascent algorithm, and/or another suitable type of algorithm. In some embodiments, the computing device 168 does not update the candidate preconditioners 168, 170 to step them towards the most likely preconditioner and/or top of the probability space, but rather updates the candidate preconditioners 168, 170 to maximize the exploration of the probability space. As depicted in image 140, this process is repeated multiple times, generating a great number of candidate preconditioners and associated performance scores. This process may continue until a threshold number of iterations have occurred (e.g., hundreds, or thousands, or more), until a desired performance score is achieved, until a time limit is reached, or until an amount of information obtained from an iteration drops below a threshold value.

Image 142 shows the correction of the results to account for imperfect exploration of the probability space. For example, the computing devices 128 may assign probability scores to each candidate preconditioner 168, 170 based on the performance during the simulations depicted in image 140, where the probabilities correspond to a likelihood that the associated candidate preconditioner is the solution for inverting the point spread function of the system/experimental setup depicted in image 134. The computing devices 128 may further correct the probabilities and/or performance scores to correct for non-uniform exploration/sample-density of the exploration of the probability space of potential preconditioners.

Image 144 shows an ATRP 162 according to the present disclosure being formed based on the probabilities and/or performance scores assigned to the candidate preconditioners 168, 170. For example, the computing devices 128 may generate the ATRP 162 by calculating the expected preconditioner from the candidate preconditioners 168, 170 and their associated scores/probabilities. In some embodiments, this may include assigning a weight to each candidate preconditioner based on the probability score and/or performance score, and then determining the ATRP 162 based at least in part of the weights. For example, the computing devices 128 may determine the weighted average preconditioner of the candidate preconditioners 168, 170. Alternatively, the computing devices 128 may determine the ATRP 162 by selecting the candidate preconditioner with the highest associated performance, probability score, and/or corrected probability score, or by combining/averaging one or more candidate preconditioners with the highest associated performance, probability score, and/or corrected probability score (e.g., the top 10, the top 5%, etc.). According to the present invention, the ATRP 162 may be generated using a generative machine learning algorithm such that the solution to the reconstruction problem is not overstepped.

FIG. 1 further includes a schematic diagram illustrating an example computing architecture 160 of the computing devices 128. Example computing architecture 160 illustrates additional details of hardware and software components that can be used to implement the techniques described in the present disclosure. Persons having skill in the art would understand that the computing architecture 160 may be implemented in a single computing device 128 or may be implemented across multiple computing devices. For example, individual modules and/or data constructs depicted in computing architecture 160 may be executed by and/or stored on different computing devices 128. In this way, different process steps of the inventive method according to the present disclosure may be executed and/or performed by separate computing devices 128.

In the example computing architecture 160, the computing device includes one or more processors 161 and memory 163 communicatively coupled to the one or more processors 161. The example computing architecture 160 can include a preconditioner generation module 174, a tomographic reconstruction module 176, and a control module 178 stored in the memory 163. The example computing architecture 160 is further illustrated as including an ATRP 162, one or more toy models 164, and one or more candidate preconditioners 174 stored on memory 163. A toy model 164 is a data structure that describes a simulated model that has been generated or otherwise selected to have feature characteristics that correspond to features that are desired to influence an ATRP 162. One or more toy models 164 may be used to train the ATRP 162. Individual toy models 164 may be generated by a user (e.g., hard coded), synthesized by a computer, selected from a previously generated collection of premade toy models, or a combination thereof, such that they include features that are expected to be present in the sample or is otherwise deemed to be important to the tomographic investigation (e.g., a trait being imaged in the particular use case). For example, a toy model 164 may be generated by a computer device 128 such that the toy model depicts a user selected feature/characteristic. In this way, this generated toy model 164 can be used to train the ATRP 162 to correct for the point spread function in samples 102 having the user selected feature/characteristic. Alternatively, or in addition, a plurality of toy models 164 may be stored on the memory 160 such that they can selected by a user or computer device 128 from a plurality of premade toy models based on the characteristics of the sample 102, charged particle system configuration, desired characteristics of the tomographic reconstruction result, etc. As can be understood by persons having skill in the art, the toy models 164 that have desired sample features/characteristics are selected, generated, or otherwise obtained so that the ATRP 162 trained using the toy models according to the present disclosure is able to correct for the point spread function in tomographic data from samples having these features/characteristics. Additionally, because the systems of the present disclosure use toy models to train the ATRP, the resultant ATRP is sample agnostic. That is, unlike prior art preconditioners that are specifically configured to apply to very restrictive sample conditions (i.e., each sample being investigated must be nearly identical to the sample used to train the prior art preconditioner), the ATRP of the present disclosure is able to correct for point spread function in tomographic data of a wide array of samples that have the features/characteristics shared by the toy models.

A candidate preconditioner 168 is a preconditioner, for use in a preconditioned iterative TRA, that is within the probability space of potential solutions to invert the point spread function of a charged particle system. That is, when applied to tomographic data, each candidate preconditioner 168 attempts to remove at least a portion of the point spread function from the data. However, as the point spread function of the charged particle system is not known, each potential candidate preconditioner can be considered to have an equal-and-negligible probability of being an ideal solution to the point spread function for a particular system, until they are tested using the various toy models 164. The candidate preconditioners 168 stored on the memory may be generated by computing devices 128 based on one or more factors (e.g., a type of experiment, type of sample, a sample characteristic, a user selection, etc.), may be previously made candidate preconditioners obtained by computing device 128.

As used herein, the term "module" is intended to represent example divisions of executable instructions for purposes of discussion and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of modules can be implemented in whole or in part by hardware (e.g., a specialized processing unit, etc.) to execute the described functions. As discussed above in various implementations, the modules described herein in association with the example computing architecture 160 can be executed across multiple computing devices 128.

The preconditioner generation module 174 can be executable by the processors 161 to generate accelerated tomographic reconstruction preconditioners 162 configured to cause iterative TRAs to more rapidly generate detailed reconstructions. In some embodiments, the preconditioner generation module 174 can be executable by the processors 161 to obtain the trajectory information 166 (e.g., a path of the charged particles 110, an angle the charged particles strike the sample 102, a position of the sample, etc.) of charged particle system 104 by accessing measured data from an experimental tomography investigation of the sample (e.g., sensor data, alignment information, system configurations, etc.), accessing user input trajectory information, accessing simulated data from a simulated tomography investigation of the sample, or a combination thereof. The preconditioner generation module 174 may then obtain at least one toy model 164 and at least one candidate preconditioner 168. The preconditioner generation module 174 may obtain the toy models 164 by generating the one or more toy models 164, accessing one or more toy model 164 stored on the memory 163, or a combination thereof. The candidate preconditioner(s) 168 may be generated by the preconditioner generation module 174 or may be selected from a list of predetermined candidate preconditioners. The preconditioner generation module 174 may obtain or select the candidate preconditioner based on one or more factors, such as a type of experiment, a desired outcome, a system configuration, a type of sample, a sample characteristic, a user selection, etc.

The preconditioner generation module 174 is further executable on the processors 161 to test the candidate preconditioners 168. For example, the preconditioner generation module 174 may model a tomographic investigation of a toy model 164 to obtain synthesized tomographic data for the toy model 164, and then apply each candidate preconditioner to the synthesized tomographic data. Alternatively, the preconditioner generation module 174 may access synthesized tomographic data that was previously generated by a modeling of a tomographic investigation of a toy model 164 and which is stored on memory 163, and then apply each candidate preconditioner 168 to the synthesized tomographic data. The preconditioner generation module 174 is then executable to assign a performance score based on the performance of the preconditioner in removing the point spread function in the synthesized data. In some embodiments, the preconditioner generation module 174 is configured to determine the performance by applying a candidate preconditioner 168 to the synthesized data to obtain preconditioned synthesized data, and then applying an iterative TRA to the preconditioned synthesized data to generate a tomographic reconstruction of one or more toy models. In various embodiments, a performance score may be assigned to the candidate preconditioner based on a comparison between the resultant reconstruction and the corresponding toy model. In some embodiments, the preconditioner generation module 174 may be further executable to assign a probability that the candidate preconditioner represents the best solution to the point spread function for the system based on its performance.

The preconditioner generation module 174 then generates one or more updated candidate preconditioners 168 by modifying a candidate preconditioner, generating a completely new candidate preconditioner, or a combination thereof. In various embodiments the preconditioner generation module 174 is configured to update the candidate preconditioners 168 to improve the performance of the corresponding candidate preconditioner, to explore an associated probability space of potential preconditioners. The candidate preconditioners may be updated by a machine learning algorithm, gradient accent algorithm, and/or another type of space filling trajectory algorithm. The preconditioner generation module 174 is programmed to iteratively repeat this cycle of testing, updating, and testing candidate preconditioners 168 until a predetermined number of iterations have occurred, a threshold number of candidate preconditioners have been tested, reception of a user input to stop, a threshold performance scores being achieved, a time limit is being reached, an amount of information obtained from an iteration dropping below a threshold value, or a combination thereof. In some embodiments, the preconditioner generation module 174 is further executable to correct the performance values assigned to the candidate preconditioners to account for non-uniform sampling of the probability space of potential preconditioners. For example, the preconditioner generation module 174 can assign probability scores to each candidate preconditioner specifying the likelihood that the associated candidate preconditioner is the solution for inverting the point spread function of the system/experimental setup depicted in image, based on their performance values and/or any prior probability distribution specified by the user. It may then apply weights/adjustments to the probabilities and/or performance scores to correct for non-uniform exploration/sample density of the exploration of the probability space of potential preconditioners.

The preconditioner generation module 174 is further executable on the processors 161 to generate the sample agnostic ATRP 162 based on the probabilities and/or performance scores assigned to the candidate preconditioners. For example, the preconditioner generation module 174 may generate the ATRP by calculating the expected preconditioner from the candidate preconditioners and their associated scores/probabilities. In some embodiments, this may include assigning a weight to each candidate preconditioner based on the probability score and/or performance score, and then determining the ATRP based at least in part of the weights (e.g., a weighted average preconditioner). Alternatively, the ATRP may be determined by selecting the candidate preconditioner with the highest associated performance, probability score, and/or corrected probability score, or by combining/averaging one or more candidate preconditioners with the highest associated performance, probability score, and/or corrected probability score (e.g., the top 10, the top 5%, etc.).

The tomographic reconstruction module 176 is executable on the processors 161 to use ATRPs 162 according to the present disclosure to perform accelerated convergence of tomographic reconstructions using iterative TRAs. For example, the tomographic reconstruction module 176 may obtain tomographic detector data that was obtained during tomographic investigation of the sample by a charged particle microscope system 104. In some embodiments, the tomographic reconstruction module 176 obtains the tomographic detector directly from the detector system 122 of the charged particle microscope system 104 performing the tomographic investigation. Alternatively, the tomographic reconstruction module 176 may obtain the tomographic detector data from a tomographic investigation of the sample may correspond to accessing the detector data from a previous tomographic investigation that is stored in an accessible memory device (i.e., over a wired or wireless connection).

The tomographic reconstruction module 176 then accessing an ATRP 162 trained for the trajectory of the tomographic investigation and applies the ATRP 162 to the tomographic detector data in the context of a preconditioned iterative TRA (e.g. the well-known preconditioned Landweber algorithm). Accessing the ATRP 162 may correspond to the ATRP 162 being generated by the preconditioner generation module 174 based on the characteristics of the charged particle system 104 that conducted the tomographic investigation of the sample 102, and/or trained using toy models that depicted features expected to be present in the sample. Alternatively, tomographic reconstruction module 176 may obtain the ATRP 162 by accessing a previously generated ATRP that was trained based on a similar charged particle microscope configuration (e.g., from a collection of stored ATRPs, an ATRP generated for a substantially similar tomographic investigation, for a temporally recent investigation where system configurations have not be adjusted, etc.).

The tomographic reconstruction module 176 is further executable to apply additional iterations of the preconditioned TRA to the tomographic data to generate a tomographic reconstruction of the sample 102. Because the preconditioner removes a large portion of the point spread function from the data without causing overstepping in the TRA, the time and computational processing required to achieve tomographic results with iterative TRAs is greatly reduced.

The control module 168 can be executable by the processors 161 to cause a computing device 128 and/or example charged particle microscope system(s) 104 to take one or more actions. For example, the control module 168 may cause the example charged particle microscope system(s) 104 to cause the sample holder 124 or sample manipulation probe 126 to apply a translation, tilt, rotation, or a combination thereof that is identified by the transformation determination module 166, and that once performed cause the sample 102 to be in a desired position and/or orientation.

The computing architecture 160 may optionally include a training module 170 that is executable to train the feature determination module 164 and/or a component machine learning algorithm(s) thereof to identify the key points in an image at salient features of the image. The training module 170 facilitates the training of the feature determination module 164 and/or a component machine learning algorithm based on a training set of one or more labeled images of similar and/or identical objects. The labels of the labeled images may include regions and/or points of the image that correspond to specific key points of an object, sections of the image that correspond to groupings of pixels of a certain class (i.e., segmentation information). The training set of images may be labeled by an expert human operator, by a computing algorithm, or a combination thereof. In some embodiments, the training module 170 may be configured to generate the training set of one or more labeled images from a single labeled image, a model, and/or a CAD drawing of the object. For example, the training module 170 may perform one or more morphing operations on the labeled image, model, and/or CAD drawing to form a plurality of labeled morphed images. The training module 170 may be configured to perform additional training with new training data, and then transmit updates the improve the performance of the feature determination module 164 and/or the component machine learning algorithm(s) thereof.

As discussed above, the computing devices 128 include one or more processors 161 configured to execute instructions, applications, or programs stored in a memory(s) 164 accessible to the one or more processors. In some examples, the one or more processors 161 may include hardware processors that include, without limitation, a hardware central processing unit (CPU), a graphics processing unit (GPU), and so on. While in many instances the techniques are described herein as being performed by the one or more processors 161, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memories 163 accessible to the one or more processors 161 are examples of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer executable instructions that, when executed by one or more processing units, cause various functions and/or operations described herein to be performed. In contrast, communication media embodies computer-readable instructions, data structures, program modules, or other data in a modulated data signal, such as a carrier wave, or other transmission mechanism. As defined herein, computer storage media does not include communication media.

Those skilled in the art will also appreciate that items or portions thereof may be transferred between memory 163 and other storage devices for purposes of memory management and data integrity. Alternatively, in other implementations, some or all of the software components may execute in memory on another device and communicate with the computing devices 128. Some or all of the system components or data structures may also be stored (e.g., as instructions or structured data) on anon-transitory, computer accessible medium or a portable article to be read by an appropriate drive, various examples of which are described above. In some implementations, instructions stored on a computer-accessible medium separate from the computing devices 128 may be transmitted to the computing devices 128 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Figure 2:
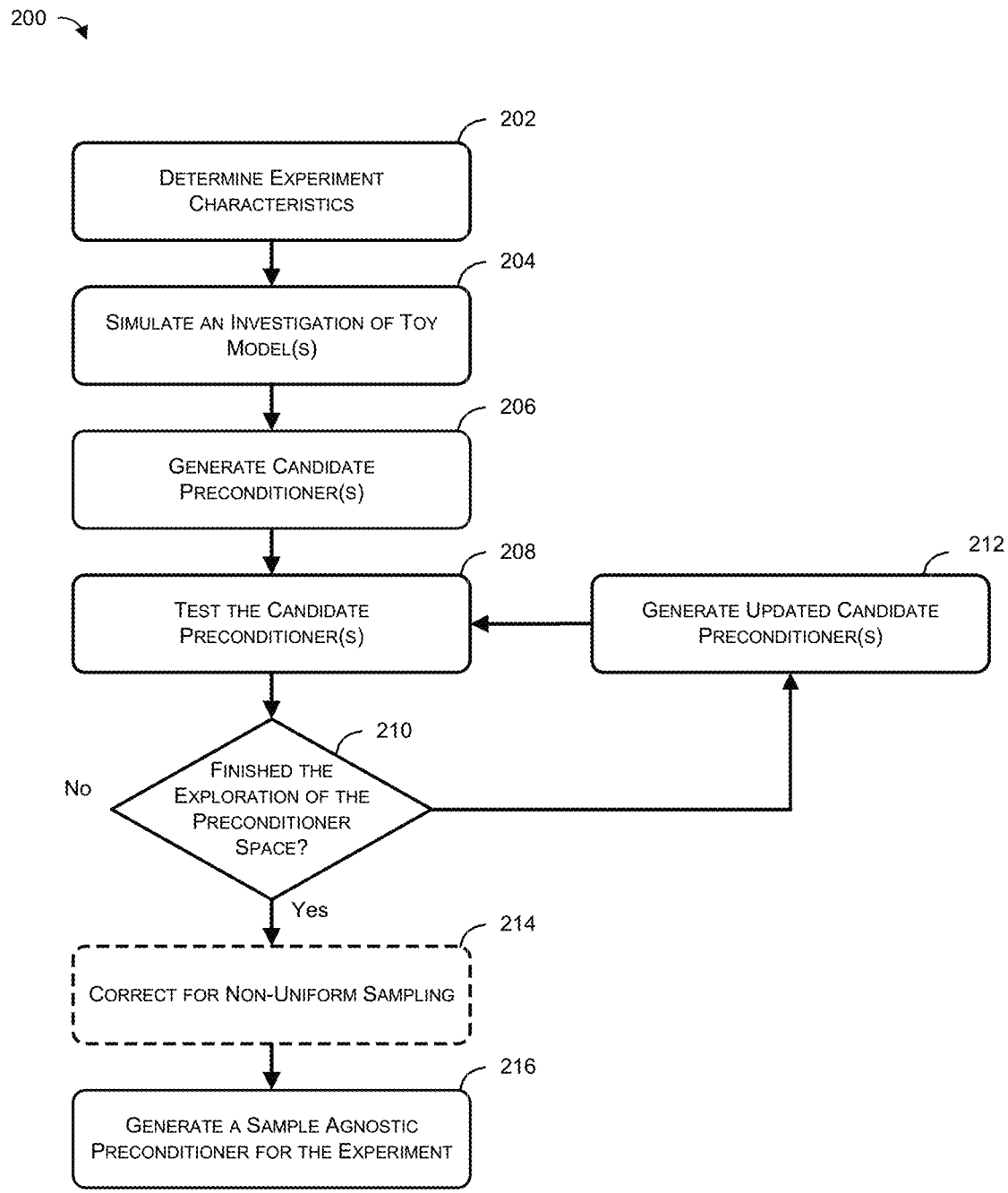
FIG. 2 depicts a sample process for generating accelerated tomographic reconstruction preconditioners configured to cause iterative TRAs to more rapidly generate detailed reconstructions.
Figure 3:
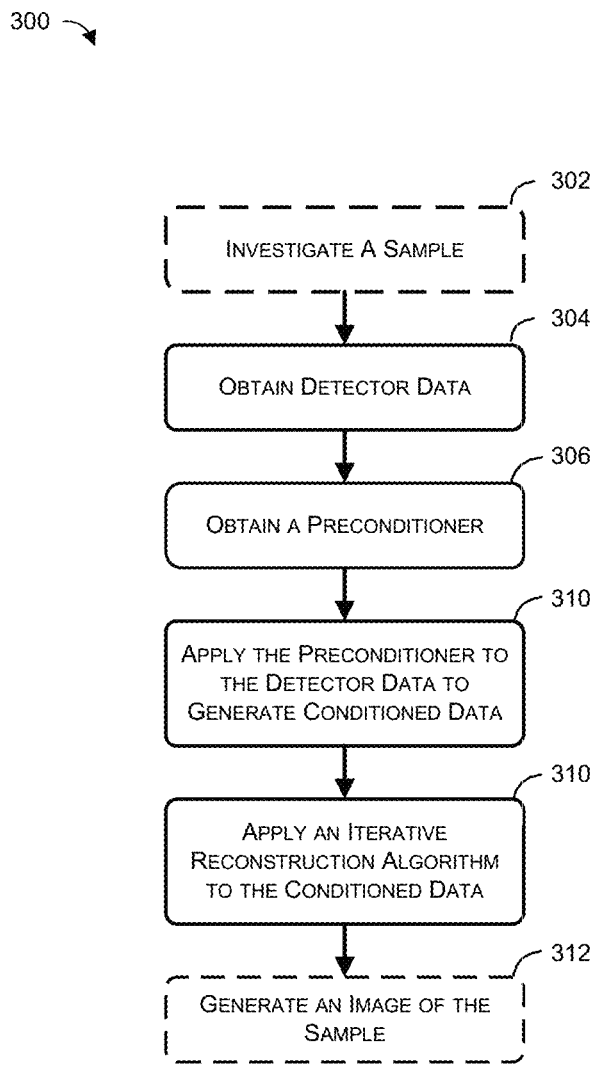
FIG. 3 depicts a sample process for accelerated convergence of tomographic reconstructions using iterative TRAs.

FIGS. 2 and 3 are flow diagrams of illustrative processes depicted as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Specifically, FIG. 2 is a flow diagram of an illustrative process 200 for generate accelerated tomographic reconstruction preconditioners configured to cause iterative TRAs to more rapidly generate detailed reconstructions. The process 200 may be implemented in environment 100 and/or by one or more computing device(s) 128, and/or by the computing architecture 160, and/or in other environments and computing devices.

At 202, the characteristics of the experiment and/or tomographic investigation of a sample(s) is determined. The characteristics of the experiment and/or tomographic investigation may correspond to a path of radiation or a charged particle beam (in X-ray tomography or electron tomography, respectively), an angle the radiation/charged beam strikes the sample, a position of the sample in the tomography system, the area(s) of the sample being investigated, or a combination thereof. In some embodiments the characteristics information is obtained by accessing measured data from an experimental tomography investigation of a sample (e.g., sensor data, alignment information, system configurations, etc.). Such measured data may be from a prior tomographic investigation of a sample or may be the measurements from the current tomographic system setup. Alternatively, or in addition, determining these characteristics may correspond to accessing user input trajectory information, simulating a tomographic investigation of a model sample, accessing previously simulated data, or a combination thereof. The characteristic information may account for at least one of thermal drift errors, sample motion errors, or other experimental errors.

At 204, an investigation of one or more toy models is simulated using the characteristics determined at step 202. The investigation of the toy model is simulated with a simulation algorithm that models the emissions that would be generated by the corresponding toy model during a tomographic investigation of the toy model with X-ray radiation/a charged particle beam, and/or models the detector data that a detector system within a tomographic system would generate when the system is conducting such a tomographic investigation. A toy model is a simulated model that is generated or otherwise selected to have feature characteristics that correspond to features that are desired to influence the accelerated tomographic reconstruction preconditioners (ATRP). One or more toy models may be used to train the ATRP. Individual toy models may be generated by a user (e.g., hard coded), synthesized by a computer, selected from a previously generated collection of premade toy models, or a combination thereof, such that they include features that are expected to be present in the sample or is otherwise deemed to be important to the tomographic investigation (e.g., a trait being imaged in the particular use case). In this way, this generated toy model can be used to train the ATRP to correct for the point spread function in samples having the user selected feature/characteristic. Alternatively, or in addition, a toy model may be selected by a user or computer device from a plurality of premade toy models based on the characteristics of the sample, tomographic system configuration, desired characteristics of the tomographic reconstruction result, etc. As can be understood by persons having skill in the art, the toy models that have desired sample features/characteristics are selected, generated, or otherwise obtained so that the ATRP trained using the toy models according to the present disclosure is able to correct for the point spread function in tomographic data from samples having these features/characteristics.

At 206, one or more candidate preconditioners are generated or otherwise obtained. For example, the candidate preconditioners may be generated based on one or more factors (e.g., a type of experiment, type of sample, a sample characteristic, a user selection, etc.), may be selected from a group of premade candidate preconditioners (e.g., previously used preconditioners), or a combination thereof. In some embodiments, a candidate preconditioner may be selected based on a type of experiment, type of sample, a sample characteristic, a user selection, etc. In some embodiments, it is assumed that each candidate preconditioner has an equal probability of being a solution to the PSF for the tomographic system configuration for the tomographic investigation of sample.

At 208, the candidate preconditioners are tested. For example, each candidate preconditioner may be tested by applying them to the synthesized data obtained from the investigation of one or more toy models in step 204, in the context of a preconditioned iterative TRA (e.g. a preconditioned Landweber algorithm). In some embodiments, one or more additional types of preconditioners may also be applied to the synthesized data such as a volume preconditioner, a projection-space preconditioner, (or a left and right preconditioner, in the language of linear algebra) etc. Moreover, in some embodiments, each candidate preconditioner may be assigned a performance score based on the performance of the preconditioner in removing the point spread function in the synthesized data. In some embodiments, the performance may be determined by applying a candidate preconditioner to the synthesized data to obtain preconditioned synthesized data, and then applying an iterative TRA to the preconditioned synthesized data to generate a tomographic reconstruction of one or more toy models. In various embodiments, a performance score may be assigned to the candidate preconditioner based on a comparison between the resultant reconstruction and the corresponding toy model. In some embodiments, the candidate preconditioner may further be assigned a probability that the candidate preconditioner represents the best solution to the point spread function for the system based on its performance.

At 210, it is determined whether the exploration of the probability space for preconditioners is complete. This determination may be made based on whether a predetermined number of iterations have occurred, a threshold number of candidate preconditioners have been tested, reception of a user input to stop, a threshold performance scores being achieved, a time limit is being reached, an amount of information obtained from an iteration dropping below a threshold value, or a combination thereof.

If the answer at 210 is no, the process continues to step 212, and one or more updated candidate preconditioners are generated. Generating one or more updated candidate preconditioners may correspond to modifying a candidate preconditioner, generating a completely new candidate preconditioner, or a combination thereof. In various embodiments the candidate preconditioners may be updated to improve the performance of the corresponding candidate preconditioner, to explore an associated probability space of potential preconditioners. The candidate preconditioners may be updated by a machine learning algorithm, gradient accent algorithm, and/or another type of suitable algorithm. The process then continues at step 208, and this process is iteratively repeated so that the preconditioner probability space is explored for the experiment and/or tomographic investigation of a sample(s) with the characteristics determined in step 202.

Alternatively, if the answer at 210 is yes, the process continues to step 214, and the results of step 208 are optionally corrected to account for non-uniform sampling of the probability space of potential preconditioners.

For example, probability scores can be assigned to each candidate preconditioner based on the performance during the step 208, where the probabilities correspond to a likelihood that the associated candidate preconditioner is the solution for the point spread function of the system/experimental setup depicted in image. Alternatively, or in addition, the probabilities and/or performance scores may be adjusted (e.g., weighted) to correct for non-uniform exploration/sample density of the exploration of the probability space of potential preconditioners.

At 216 a sample-agnostic preconditioner is generated, where the preconditioner is configured to cause iterative TRAs to more rapidly generate detailed reconstructions of samples investigated with characteristics determined in step 202 (or with similar characteristics). Specifically, a sample agnostic ATRP is generated based on the probabilities and/or performance scores assigned to the candidate preconditioners in step 208 or those probability and/or performance scores corrected in step 214, or a combination thereof. For example, the ATRP may be generated by calculating the expected preconditioner from the candidate preconditioners and their associated scores/probabilities. In some embodiments, this may include assigning a weight to each candidate preconditioner based on the probability score and/or performance score, and then determining the ATRP based at least in part of the weights (e.g., a weighted average preconditioner). Alternatively, the ATRP may be determined by selecting the candidate preconditioner with the highest associated performance, probability score, and/or corrected probability score, or by combining/averaging one or more candidate preconditioners with the highest associated performance, probability score, and/or corrected probability score (e.g., the top 10, the top 5%, etc.). According to the present invention, the ATRP may be generated using a generative machine learning algorithm such that the solution to the PSE is not overstepped.

Specifically, FIG. 3 is a flow diagram of an illustrative process 300 for accelerated convergence of tomographic reconstructions using iterative TRAs. The process 300 may be implemented in environment 100 and/or by one or more computing device(s) 128, and/or by the computing architecture 160, and/or in other environments and computing devices.

At 302, a sample is optionally investigated with tomographic techniques. For example, a sample may be irradiated at a plurality of angles with X-ray radiation/a charged particle beam within a tomographic system, and detector data may be generated by a detector system within the tomographic system based on the emission resultant from the irradiation of the sample.

At 304, detector data is obtained from a tomographic investigation of the sample. In some embodiments, obtaining the detector data correspond to receiving the detector data directly from the detector system of a tomographic system in step 302. Alternatively, obtaining the detector data from a tomographic investigation of the sample may correspond to accessing the detector data from a previous tomographic investigation that is stored in an accessible memory device (i.e., over a wired or wireless connection).

At 306, an accelerated tomographic reconstruction preconditioner is obtained that is configured to cause iterative TRAs to more rapidly generate detailed reconstructions. The ATRP may be obtained using the processes described herein, including but not limited to the process described in FIG. 2 and/or the processes and system described in FIG. 1 For example, the ATRP may be generated based on the characteristics of the tomographic system that conducted the tomographic investigation of the sample, and/or trained using toy models that depicted features expected to be present in the sample. Alternatively, the ATRP may correspond to accessing a previously generated ATRP that was trained based on a similar tomographic microscope configuration (e.g., from a collection of stored ATRPs, an ATRP generated for a substantially similar tomographic investigation, for a temporally recent investigation where system configurations have not be adjusted, etc.).

At 308, the accelerated tomographic reconstruction preconditioner is applied to the detector data in the context of a preconditioned iterative TRA. The ATRP is configured to expedite convergence of an iterative tomographic reconstruction algorithm (TRA) by reducing from reconstructed image at least a portion of the blurring effects of the point spread function (PSF) of the tomographic system. In this way, the number of iterations required for iterative TRAs to generate tomographic reconstructions of the sample from experimental tomographic data preconditioned with ATRP is greatly reduced. This not only reduces the computational processing required to achieve tomographic results with iterative TRAs, but it also greatly reduces the time needed to obtain such results. The accelerated tomographic reconstruction preconditioner is configured to expedite the convergence of an iterative tomographic reconstruction algorithm by reducing the number of iterations required for an iterative tomographic reconstruction algorithm to subsequently come to a tomographic reconstruction of the sample. According to the present invention, the accelerated tomographic reconstruction preconditioners generated using the methods and systems herein may be agnostic to the trajectory of the X-ray radiation/charged particles in the tomography investigation of the sample.

At 310, further iterations of the preconditioned iterative TRA may be applied. For example, the iterative TRA is able to generate a tomographic reconstruction of the sample based on the conditioned data with greatly reduced time to result and greatly reduced computation al requirements. Thus, the ATRPs of the present disclosure enables tomographic processes utilizing iterative TRAs to overcome current technical problems, opening up the potential for iterative TRAs to become a practicable alternative to prior art direct TRAs. At 312 an image of the sample may then be optionally generated based on the output of the iterative reconstruction algorithm from step 312.

Figure 4:
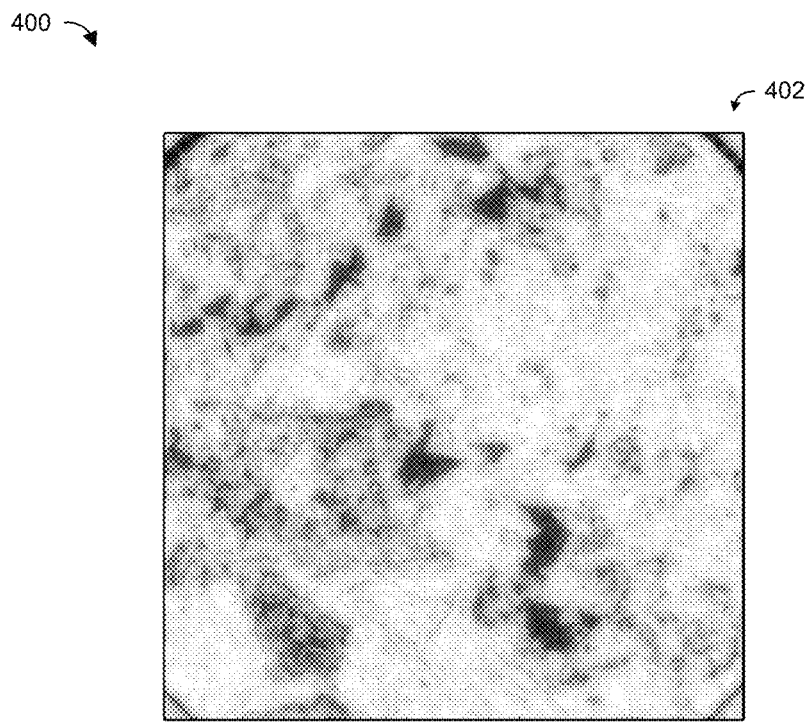
FIG. 4 shows a tomographic reconstruction of a sample generated using prior art iterative tomographic reconstruction processes.
Figure 5:
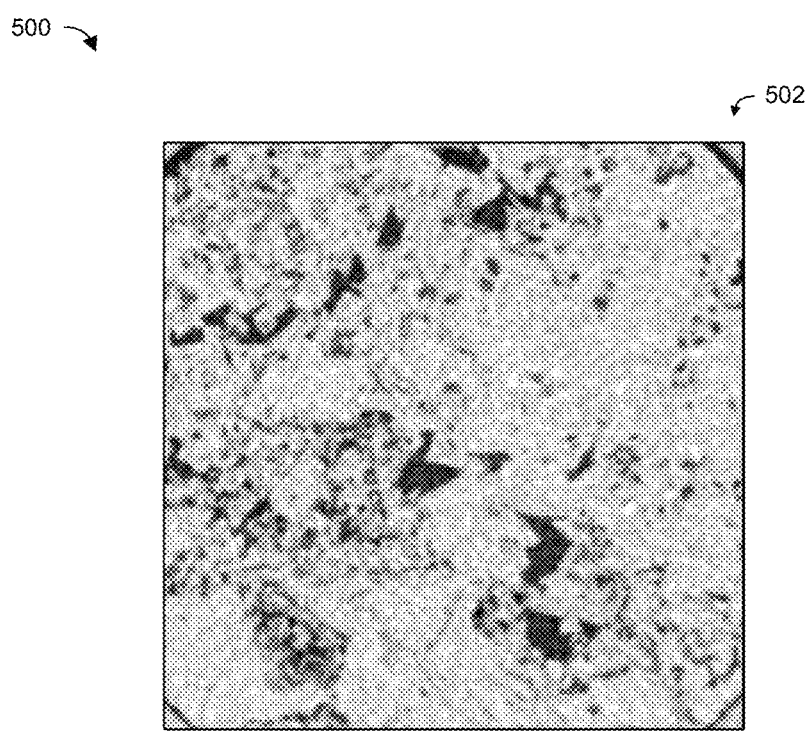
FIG. 5 shows a tomographic reconstruction of a sample generated using an accelerated tomographic reconstruction preconditioner and an iterative tomographic reconstruction algorithm according to the present disclosure.

FIGS. 4 and 5 a tomographic reconstruction 400 of a sample generated using prior art iterative tomographic reconstruction processes, and a tomographic reconstruction 500 generated using an accelerated tomographic reconstruction preconditioner and an iterative tomographic reconstruction algorithm according to the present disclosure, respectively. It is noted that, in addition to the reconstruction 500 requiring greatly reduced time and computational resources because of the accelerated tomographic reconstruction preconditioner, the reconstruction 500 also has an improved image quality over the reconstruction 400 generated using prior art iterative tomographic reconstruction techniques.

Examples of inventive subject matter according to the present disclosure are described in the following enumerated paragraphs.

A1. A method for generating an accelerated tomographic reconstruction preconditioner for accelerated iterative tomographic reconstruction, the method comprising: accessing data for a tomography investigation of a sample; determining a trajectory of charged particles in a tomography investigation of a sample; accessing one or more toy model samples, wherein individual toy models correspond to a simulated model that depicts at least one feature characteristic of the sample; selecting at least one candidate preconditioner; determining a first performance of each of the at least one candidate preconditioner on the one or more toy samples; updating each of the at least one candidate preconditioners to create one or more updated candidate preconditioners; determining a second performance of each of the at least one updated candidate preconditioner on the one or more toy samples; and generating an accelerated tomographic reconstruction preconditioner based on at least the first performance and the second performance.

A1.1. The method of paragraph A1, wherein the accelerated tomographic reconstruction preconditioner is configured to expedite the convergence of an iterative tomographic reconstruction algorithm.

A1.1.1. The method of paragraph A1.1, wherein the accelerated tomographic reconstruction preconditioner is configured to reduce the number of iterations required for the iterative tomographic reconstruction algorithm to come to a tomographic reconstruction of the sample.

A1.2. The method of any of paragraphs A1-A1.1.1, wherein the accelerated tomographic reconstruction preconditioner is agnostic to the trajectory of the charged particles in the tomography investigation of the sample.

A1.3. The method of any of paragraphs A1-A1.1.2, wherein the accelerated tomographic reconstruction preconditioner is configured to apply to different samples, types of samples, and/or sample features.

A2. The method of any of paragraphs A1-A1.3, wherein accessing the measured data corresponds to accessing measured data from an experimental tomography investigation of the sample.

A2.1. The method of any of paragraphs A1-A2, wherein accessing the data comprises accessing user input trajectory information, sensor information from a microscope system, etc.

A3. The method of any of paragraphs A1-A2.1, wherein accessing the measured data corresponds to accessing simulated data from a simulated tomography investigation of the sample.

A4. The method of any of paragraphs A1-A3, where the trajectory of charged particles in the tomography investigation of the sample is based on an actual experimental trajectory.

A4.1. The method of any of paragraphs A1-A4, wherein the experimental trajectory accounts for at least one of thermal drift errors, sample motion errors, or other experimental errors.

A4.2. The method of any of paragraphs A1-A4, wherein the experimental trajectory accounts for thermal drift errors.

A4.3. The method of any of paragraphs A1-A4, wherein the experimental trajectory accounts for sample motion errors.

A5. The method of any of paragraphs A1-A4.3, wherein the trajectory of charged particles in a tomography investigation corresponds to one or more of: the path of the charged particles; the angle the charged particles strike the sample; and the position of the sample in the charged particle system.

A6. The method of any of paragraphs A1-A5, further comprising correcting the first performance and the second performance to correct for a non-uniform sampling density.

A7. The method of any of paragraphs A1-A6, further comprising generating an expected reconstruction of the measured data from the tomography investigation of the sample.

A8. The method of any of paragraphs A1-A8, wherein the feature characteristics of the toy models correspond to features that that influence the preconditioner.

A8.1. The method of paragraph A8, where the toy models are generated by a user.

A8.1.1. The method of paragraph A8.1, where the toy models are hard coded by the user.

A8.2. The method of paragraph A8, where the toy models are selected from a collection of premade toy models based on at least one of: a type of experiment; a point spread function associated with the experiment; the trajectory of charged particles in a tomography investigation; a sample type; a feature characteristic of the sample; and a user selection.

A8.2.1. The method of paragraph A8.2, wherein at least one of the collections of premade toy models were generated in association with a previous tomographic investigation.

A8.2.1.1. The method of paragraph A8.2.1, wherein at least one candidate toy model is selected from the collection based on similarity to the previous tomographic investigation.

A8.2.1.1.1. The method of paragraph A8.2.1.1, wherein the similarity to the previous tomographic investigation corresponds to a similar sample, sample location, sample type, sample feature, time of investigation, and/or charged particle system setup or configuration.

A8.3. The method of paragraph A4, where the toy models are generated by a computer based on at least one of: a type of experiment; a point spread function associated with the experiment; the trajectory of charged particles in a tomography investigation; a sample type; a feature characteristic of the sample; and a user selection.

A8.3.1. The method of paragraph A4.3, wherein the toy models are synthesized to include a plurality of user selected features.

A9. The method of any of paragraphs A1-A8.3.1, wherein selecting the at least one candidate preconditioner comprises assuming all candidate preconditioners have an equal probability.

A9.1. The method of paragraph A9, wherein assuming all candidate preconditioners have an equal probability corresponds to assuming all candidate preconditioners a probability of zero.

A9.1.1. The method of paragraph A9.1, wherein all candidate preconditioners are assumed to have a probability of zero until their associated probability is calculated.

A10. The method of any of paragraphs A1-A9.1.1, wherein selecting the at least one candidate preconditioner comprises generating a candidate preconditioner.

A10.1. The method of paragraph A10, wherein selecting the at least one candidate preconditioner comprises generating a plurality of candidate preconditioners.

A10.2. The method any of paragraphs A10-A10.1, where the at least one candidate preconditioner is generated by a computer based on at least one of: a type of experiment; a sample type; a sample characteristic; and a user selection.

A11. The method of any of paragraphs A1-A10.2, wherein selecting the at least one candidate preconditioner comprises selecting a candidate preconditioner from a group of premade candidate preconditioners.

A11.1. The method of paragraph A11, wherein selecting the at least one candidate preconditioner comprises selecting a plurality of candidate preconditioners from the group of premade candidate preconditioners.

A11.2. The method any of paragraphs A11-A11.1, where the at least one candidate preconditioner is selected by a computer based on at least one of: a type of experiment; a sample type; a sample characteristic; and a user selection.

A12. The method of any of paragraphs A1-A11.2, wherein each of the at least one candidate preconditioners are updated based on the performance of the corresponding candidate preconditioner.

A12.1. The method of paragraph A12, wherein the updates to at least one candidate preconditioner is configured to improve the performance of the corresponding candidate preconditioner.

A12.2. The method of any of paragraphs A12-A12.1, wherein the candidate preconditioners are updated to explore an associated probability space of potential preconditioners.

A12.2.1. The method of paragraph A12.2, wherein updating the candidate preconditioners does not comprise stepping towards the most likely preconditioner and/or top of the probability space.

A12.2.2. The method of paragraph A12.2, wherein updating the candidate preconditioners comprises determining an expected top of the associated probability space; and updating at least one candidate preconditioner to step it towards the expected top of the associated probability space.

A12.3. The method of any of paragraphs A12-A12.2.2, wherein the candidate preconditioners are updated with a machine learning algorithm.

A12.3.1. The method of paragraph A12.3, the candidate preconditioners are updated with a gradient accent algorithm.

A12.4. The method of any of paragraphs A12-A12.3.1, wherein the candidate preconditioners are updated with a space filling trajectory algorithm.

A13. The method of any of paragraphs A1-A12.4, wherein determining a first performance of each of the at least one candidate preconditioner comprising testing the performance of each of the candidate preconditioners on the one or more toy samples.

A13.1. The method of paragraph A13, wherein testing the performance of each of the candidate preconditioners on the one or more toy samples comprises: synthesizing tomographic investigations of the one or more toy samples; determining synthesized tomographic data for the synthesized tomographic investigations; applying a candidate preconditioner to the synthesized tomographic data to obtain preconditioned synthesized tomographic data.

A13.1.1. The method of paragraph A13.1, wherein testing the performance of each of the candidate preconditioners on the one or more toy samples further comprises: applying an iterative tomographic reconstruction algorithm to the preconditioned synthesized tomographic data to generate a tomographic reconstruction of one or more toy models; and determining a corresponding performance of the candidate preconditioner applied to the synthesized tomographic data based on a comparison between: one or more toy models; and the tomographic reconstruction of one or more toy models.

A13.1.2. The method of any of paragraphs A13.1-A13.1.1, wherein synthesized tomographic investigations of the one or more toy samples has the same scan trajectory as the trajectory of the tomography investigation of a sample.

A14. The method of any of paragraphs A1-A13.1.2, further comprising: updating each of the at least one updated candidate preconditioners to create one or more updated candidate preconditioners; and determining a second performance of each of the at least one updated candidate preconditioner on the one or more toy samples.

A14.1. The method of paragraph A10, further comprising repeatedly updating candidate preconditioners after they have been tested, and after each update determining a corresponding performance for each newly updated candidate preconditioner.

A14.2. The method of paragraph A10, further comprising repeatedly updating candidate preconditioners after they have been tested, and after each update determining a corresponding performance for each newly updated candidate preconditioner until a threshold number of iterations have occurred.

A14.3. The method of paragraph A10, further comprising repeatedly updating candidate preconditioners after they have been tested, and after each update determining a corresponding performance for each newly updated candidate preconditioner until a preset condition occurs.

A14.4. The method of paragraph A10, further comprising repeatedly updating candidate preconditioners after they have been tested, and after each update determining a corresponding performance for each newly updated candidate preconditioner until an amount of information obtained from an iteration drops below a threshold value.

A14.5. The method of any of paragraphs A10-A10.4, wherein repeatedly updating candidate preconditioners after they have been tested comprises generating more than one hundred preconditioners.

A14.6. The method of any of paragraphs A10-A10.5, wherein repeatedly updating candidate preconditioners after they have been tested comprises generating more than one thousand preconditioners.

A15. The methods of any of paragraphs A1-A14.6, wherein generating the accelerated tomographic reconstruction preconditioner comprises: determining a probability score for each of the candidate preconditioners based on an associated performance; and generating the accelerated tomographic reconstruction preconditioner based on the probability scores.

A15.1. The method of paragraph A15, wherein generating the accelerated tomographic reconstruction preconditioner comprises constructing the expect preconditioner based on the probability scores.

A15.1.1. The method of paragraph A15.1, wherein generating the accelerated tomographic reconstruction preconditioner comprises assigning a weight to each candidate preconditioner based on the probability scores and determining a weighted average of the candidate preconditioners to form the accelerated tomographic reconstruction preconditioner.

A15.2. The method of paragraph A15, wherein generating the accelerated tomographic reconstruction preconditioner comprises assigning a weight to each candidate preconditioner based on the probability scores; and combining the weighted candidate preconditioners to form the accelerated tomographic reconstruction preconditioner.

A15.3. The method of any of paragraphs A15-A15.2, further comprising correcting the probability scores for each of the candidate preconditioners to correct for non-uniform sample density of the potential preconditioner space.

A15.4. The method of any of paragraphs A15-A15.3, where generating the accelerated tomographic reconstruction preconditioner comprises selecting the candidate preconditioner with the highest associated performance, probability score, and/or corrected probability score.

A15.5. The method of any of paragraphs A15-A15.4, wherein generating the accelerated tomographic reconstruction preconditioner comprises combining one or more candidate preconditioners with the highest associated performance, probability score, and/or corrected probability score.

A15.6. The method of any of paragraphs A15-A15.5, wherein generating the accelerated tomographic reconstruction preconditioner is performed using a generative machine learning algorithm.

A16. The method of any of paragraphs A1-A15.6, wherein the accelerated tomographic reconstruction preconditioner is configured to remove at least a portion of the effects of a the point spread function (PSF) of the experimental system in tomographic detector data detected during a tomographic investigation of a sample.

A16.1. The method of paragraph A16, wherein the PSF describes the estimated blurring in a charged particle microscope environment.

A16.1.1. The method of paragraph A16, wherein the PSF describes the blurring within the imaging system for a certain scanning trajectory and location on the sample.

A16.2. The method of any of paragraphs A16-A16.1.1, wherein accelerated tomographic reconstruction preconditioner is configured to not over correct and/or overstep the PSF.

A17. The method of any of paragraphs A1-A16.2, further comprising: receiving experimental detector data from an experimental tomographic investigation of a sample; applying the tomographic reconstruction preconditioner to the experimental detector data to obtain preconditioned experimental detector data; generating a tomographic reconstruction of the sample based on the preconditioned experimental detector data.

A17.1. The method of paragraphs A17, wherein the tomographic reconstruction preconditioner at least partially removes effects of a PSF of the experimental system on the experimental detector data.

A17.2. The method of any of paragraphs A17-A17.1, wherein generating a tomographic reconstruction of the sample comprises applying an iterative tomographic reconstruction algorithm to the preconditioned experimental detector data.

A17.3. The method of any of paragraphs A17-A17.2, wherein the preconditioned data requires less work from the iterative tomographic reconstructive algorithm to obtain a final result that it would take for the experimental detector data.

B1. A method for accelerated iterative tomographic reconstruction using an accelerated tomographic reconstruction preconditioner, the method comprising: receiving experimental detector data from an experimental tomographic investigation of a sample; applying a tomographic reconstruction preconditioner to the experimental detector data to obtain preconditioned experimental detector data; applying an iterative tomographic reconstruction algorithm to the preconditioned experimental detector data to generate a tomographic reconstruction of the sample based on the preconditioned experimental detector data.

B.1.1. The method of paragraphs B1, wherein the tomographic reconstruction preconditioner at least partially removes effects of a PSF of the experimental system on the experimental detector data.

B.1.2. The method of any of paragraphs B1-B1.1, wherein the preconditioned data requires less work from the iterative tomographic reconstructive algorithm to obtain a final result that it would take for the experimental detector data.

B2. The method of any of paragraphs B1-B1.2, wherein the tomographic reconstruction preconditioner is generated based at least in part on a comparison between simulated data from a simulation of a test experiment and acquired data from the actual test experiment.

B.2.1. The method of any of paragraphs B1-B2, wherein the characteristics of the simulation of the test experiment are designed to mimic the characteristics of the actual test experiment.

B.2.3. The method of any of paragraphs B1-B2.2, wherein the preconditioner does not overstep the solution to the point spread function.

B3. The method of any of paragraphs B1-B2.3, wherein the tomographic reconstruction preconditioner is generated using any of the methods of paragraphs A1-A16.2.

B4. The method of any of paragraphs B1-B2.3, further comprising generating the tomographic reconstruction preconditioner using any of the methods of paragraphs A1-A16.2.

C1. A charged particle system for accelerated iterative tomographic reconstruction using an accelerated tomographic reconstruction preconditioner, the system comprising: a charged particle emitter configured to emit a charged particle beam towards a sample; a sample holder configured to hold the sample; a detector system configured to detect emissions resultant from the irradiation of the sample with the charged particle beam;
one or more processors; and a memory, wherein the memory stores non-transitory computer readable instructions that, when executed on the one or more processors, cause the system to perform a method of any of paragraphs A1-A17.3 or B1-B4.

D1. A computing system for accelerated iterative tomographic reconstruction using an accelerated tomographic reconstruction preconditioner, the computing system comprising; one or more processors; and a memory, wherein the memory stores non-transitory computer readable instructions that, when executed on the one or more processors, cause the system to perform a method: of any of paragraphs A1-A17.3 or B1-B4.

E1. Use of a system of paragraph C1 or D1.

F1. A computer readable medium storing non-transitory computer readable instructions that, when executed on one or more processors, cause the one or processors system to cause performance of a method of any of paragraphs A1-A17.3 or B1-B4. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "determine," "identify," "produce," and "provide" to describe the disclosed methods. These terms are high-level abstractions of the actual operations that are performed. The actual operations that correspond to these terms will vary depending on the particular implementation and are readily discernible by one of ordinary skill in the art.

What is claimed is:

1. A method for generating a tomographic reconstruction preconditioner for accelerated iterative tomographic reconstruction, the method comprising:
accessing data from a tomography investigation of a sample;
determining a trajectory of a source of penetrating radiation relative to the sample during the tomography investigation of a sample;
accessing one or more toy models, wherein individual toy models correspond to a simulated model that depicts at least one feature characteristic of the sample;
selecting at least one candidate preconditioner;
determining a first performance of a first candidate preconditioner of the at least one candidate preconditioner on the one or more toy samples;
determining a second performance of a second candidate preconditioner on the one or more toy samples; and
generating a tomographic reconstruction preconditioner based on at least the first performance and the second performance, wherein the tomographic reconstruction preconditioner is configured to expedite the convergence of an iterative tomographic reconstruction algorithm.

2. The method of claim 1, further comprising obtaining the second candidate preconditioner by updating the first preconditioner based at least in part on the first performance to create the second candidate preconditioner.

3. The method of claim 1, wherein the tomographic reconstruction preconditioner is configured to apply across different samples, types of samples, and sample having different features.

4. The method of claim 1, wherein the candidate preconditioners are updated to explore an associated probability space of potential preconditioners using a gradient accent algorithm.

5. The method of claim 1, wherein testing the performance of each of the candidate preconditioners on the one or more toy samples comprises:
synthesizing tomographic investigations of the one or more toy samples;
determining synthesized tomographic data for the synthesized tomographic investigations.

6. The method of claim 5, wherein testing the performance of each of the candidate preconditioners on the one or more toy samples further comprises:
applying a candidate preconditioner in the context of a preconditioned iterative tomographic reconstruction algorithm to the synthesized tomographic data, to generate a tomographic reconstruction of one or more toy models; and
determining a corresponding performance of the candidate preconditioner applied to the synthesized tomographic data based on a comparison between:

one or more toy models; and the tomographic reconstruction of one or more toy models.

7. The method of claim 5, wherein synthesized tomographic investigations of the one or more toy samples has the same scan trajectory as the trajectory of the tomography investigation of a sample.

8. The method of claim 1, further comprising:

updating each of the at least one candidate preconditioners to create one or more updated candidate preconditioners; and determining a third performance of each of the at least one updated candidate preconditioner on the one or more toy samples.

9. The method of claim 8, further comprising repeatedly updating candidate preconditioners after they have been tested, and after each update determining a corresponding performance for each newly updated candidate preconditioner.

10. The method claim 1, wherein generating the tomographic reconstruction preconditioner comprises:

determining a probability score for each of the candidate preconditioners based on an associated performance; and generating the tomographic reconstruction preconditioner based on the probability scores.

11. The method of claim 10, wherein generating the accelerated tomographic reconstruction preconditioner comprises:

assigning a weight to each candidate preconditioner based on the probability scores; and combining the weighted candidate preconditioners to form the tomographic reconstruction preconditioner.

12. The method of claim 10, further comprising correcting the probability scores for each of the candidate preconditioners to correct for non-uniform sample density of a probability space of potential preconditioners.

13. The method claim 1, wherein the tomographic reconstruction preconditioner is configured to remove at least a portion of the effects of a point spread function (PSF) of the experimental system in tomographic detector data detected during a tomographic investigation of a sample.

14. The method claim 13, wherein tomographic reconstruction preconditioner is configured to not over correct and/or overstep the PSF.

15. The method of claim 1, further comprising:

receiving experimental detector data from an experimental tomographic investigation of a sample;

applying the tomographic reconstruction preconditioner to the experimental detector data to obtain preconditioned experimental detector data; and applying an iterative tomographic reconstruction algorithm to the preconditioned experimental detector data to generate a tomographic reconstruction of the sample based on the preconditioned experimental detector data.

16. A method for accelerated iterative tomographic reconstruction using an accelerated tomographic reconstruction preconditioner, the method comprising:

receiving experimental detector data from an experimental tomographic investigation of a sample;

obtaining a tomographic reconstruction preconditioner, wherein the tomographic reconstruction preconditioner is sample agnostic and configured to expedite the convergence of an iterative tomographic reconstruction algorithm;

applying the tomographic reconstruction preconditioner to the experimental detector data to obtain preconditioned experimental detector data; and applying an iterative tomographic reconstruction algorithm to the preconditioned experimental detector data to generate a tomographic reconstruction of the sample based on the preconditioned experimental detector data.

17. The method of claim 16, wherein obtaining the tomographic reconstruction preconditioner comprises:

determining a trajectory of a source of penetrating radiation relative to the sample during the experimental tomographic investigation of the sample;

accessing one or more toy models, wherein individual toy models correspond to a simulated model that depicts at least one feature characteristic of the sample;

selecting at least one candidate preconditioner;

determining a first performance of a first candidate preconditioner of the at least one candidate preconditioner on a simulated tomographic investigation of the one or more toy samples;

determining a second performance of a second candidate preconditioner on the simulated tomographic investigation of the one or more toy samples; and generating the tomographic reconstruction preconditioner based on at least the first performance and the second performance, wherein the tomographic reconstruction preconditioner is configured to expedite the convergence of an iterative tomographic reconstruction algorithm.

18. An X-ray tomography system for accelerated iterative tomographic reconstruction using an accelerated tomographic reconstruction preconditioner, the system comprising:

a source of X-ray radiation configured to emit a radiation towards a sample;

a sample holder configured to hold the sample;

a detector system configured to detect emissions resultant from the irradiation of the sample with the radiation;

one or more processors; and a memory, wherein the memory stores non-transitory computer readable instructions that, when executed on the one or more processors, cause the system to perform the steps of:

accessing data from a tomography investigation of a sample;

determining a trajectory of the source of penetrating radiation relative to the sample during the tomography investigation of a sample;

accessing one or more toy models, wherein individual toy models correspond to a simulated model that depicts at least one feature characteristic of the sample;

selecting at least one candidate preconditioner;

determining a first performance of each of the at least one candidate preconditioner on the one or more toy samples;

updating each of the at least one candidate preconditioners to create one or more updated candidate preconditioners;

determining a second performance of each of the at least one updated candidate preconditioner on the one or more toy samples; and generating, based on at least the first performance and the second performance, an accelerated tomographic reconstruction preconditioner, wherein the accelerated tomographic reconstruction preconditioner is configured to expedite the convergence of an iterative tomographic reconstruction algorithm.

19. The X-ray tomography system of claim 18, wherein the instructions further cause the system to perform the steps of:
   receiving experimental detector data from an experimental tomographic investigation of a sample;
   applying a tomographic reconstruction preconditioner, in the context of a preconditioned iterative tomographic reconstruction algorithm, to the experimental detector data to generate a tomographic reconstruction of the sample based on the experimental detector data and the tomographic preconditioner.

20. The X-ray tomography system of claim 18, wherein testing the performance of each of the candidate preconditioners on the one or more toy samples comprises:
   synthesizing tomographic investigations of the one or more toy samples;
   determining synthesized tomographic data for the synthesized tomographic investigations;
   applying a candidate preconditioner in the context of a preconditioned iterative tomographic reconstruction algorithm, to the synthesized tomographic data to generate a tomographic reconstruction of one or more toy models; and
   determining a corresponding performance of the candidate preconditioner applied to the synthesized tomographic data based on a comparison between:
      one or more toy models; and
      the tomographic reconstruction of one or more toy models.

21. The X-ray tomography system of claim 18, wherein the accelerated tomographic reconstruction preconditioner does not cause the preconditioned iterative tomographic reconstruction algorithm to overstep the solution to the tomographic reconstruction problem.

22. A computer readable medium storing non-transitory computer readable instructions that, when executed on one or more processors, cause the one or processors system to cause performance of the steps of:
   accessing data from a tomography investigation of a sample;
   determining a trajectory of a source of penetrating radiation relative to the sample during the tomography investigation of a sample;
   accessing one or more toy models, wherein individual toy models correspond to a simulated model that depicts at least one feature characteristic of the sample;
   selecting at least one candidate preconditioner;
   determining a first performance of each of the at least one candidate preconditioner on the one or more toy samples;
   updating each of the at least one candidate preconditioners to create one or more updated candidate preconditioners;
   determining a second performance of each of the at least one updated candidate preconditioner on the one or more toy samples; and
   generating, based on at least the first performance and the second performance, an accelerated tomographic reconstruction preconditioner, wherein the accelerated tomographic reconstruction preconditioner is configured to expedite the convergence of an iterative tomographic reconstruction algorithm.

* * * * *